(12) United States Patent
Katsuda et al.

(10) Patent No.: US 6,854,395 B2
(45) Date of Patent: Feb. 15, 2005

(54) INFLATOR FOR AN AIR BAG

(75) Inventors: Nobuyuki Katsuda, Hyogo (JP); Mikio Yabuta, Hyogo (JP); Jianzhou Wu, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 10/213,067

(22) Filed: Aug. 7, 2002

(65) Prior Publication Data

US 2003/0051630 A1 Mar. 20, 2003

Related U.S. Application Data

(60) Provisional application No. 60/358,697, filed on Feb. 25, 2002.

(30) Foreign Application Priority Data

Aug. 10, 2001 (JP) .......................................... 2001-244552
Dec. 7, 2001 (JP) .......................................... 2001-374784

(51) Int. Cl.⁷ ............................ C06D 5/00; C06B 47/08; C06B 31/00
(52) U.S. Cl. ............................ 102/530; 149/36; 149/45; 280/741
(58) Field of Search ...................... 149/36, 45; 102/530; 280/736, 741

(56) References Cited

U.S. PATENT DOCUMENTS

| | | | |
|---|---|---|---|
| 4,369,079 A | 1/1983 | Shaw | |
| 4,370,181 A | 1/1983 | Lundstrom et al. | |
| 4,909,549 A | 3/1990 | Poole et al. | |
| 5,542,999 A | 8/1996 | Bucerius et al. | |
| 6,126,197 A | 10/2000 | Muir et al. | |
| 6,135,496 A | 10/2000 | Katsuda et al. | |
| 6,143,102 A | 11/2000 | Mendenhall et al. | |
| 6,183,006 B1 | 2/2001 | Katsuda et al. | |
| 6,196,581 B1 | 3/2001 | Katsuda et al. | |
| 6,517,647 B1 * | 2/2003 | Yamato ........................ | 149/45 |
| 2003/0024618 A1 | 2/2003 | Wu et al. | |

FOREIGN PATENT DOCUMENTS

| | | |
|---|---|---|
| EP | 0 476 886 A1 | 3/1992 |
| EP | 0 482 852 A1 | 4/1992 |
| EP | 0 949 267 A1 | 10/1999 |
| EP | 0 968 986 A1 | 1/2000 |
| JP | 10-72273 A | 3/1998 |
| JP | 11-020598 A | 1/1999 |
| JP | 11-503104 A | 3/1999 |
| JP | 2000-273090 A | 10/2000 |
| WO | WO96/30716 A1 | 10/1996 |
| WO | WO98/29426 A1 | 7/1998 |
| WO | WO00/50273 A1 | 8/2000 |
| WO | WO01/56953 A1 | 8/2001 |

\* cited by examiner

*Primary Examiner*—Aileen Felton
(74) *Attorney, Agent, or Firm*—Birch, Stewart, Kolasch & Birch, LLP

(57) ABSTRACT

An inflator for an air bag has, in a housing having a gas discharging port, a combustion chamber accommodating a molded article of a gas generating composition which is burnt to generate gas and ignition means to ignite the molded article of a gas generating composition. The molded article contains a metal component and meets the requirement: (A) the (theoretical) combustion flame temperature of the molded article of the gas generating composition is 2000° C. or less, and part or the whole of the metal or metal oxide after combustion of the molded article of the gas generating composition has a melting point not lower than the combustion flame temperature; and (B) bulk combustion residues remain in the combustion chamber at the time of combustion of the molded article of the gas generating composition.

51 Claims, 6 Drawing Sheets

INFLATOR FOR AN AIR BAG

This application claims priority on provisional Application No. 60/358,697 filed on Feb. 25, 2002, the entire contents of which are hereby incorporated by reference.

TECHNICAL FIELD TO WHICH THE INVENTION BELONGS

The present invention relates to an inflator for an air bag using a molded article of a gas generating composition suitable for a restraining system with airbags mounted in automobiles etc., and an airbag apparatus using the same.

BACKGROUND ART

Conventionally, various gas generating agents for airbags have been used in inflators for an air bag as a passenger-protecting device in an automobile. As the gas generating agent for airbags, compositions comprising sodium azide have often been used. However, the toxicity of sodium azide to the human body [LD50 (oral-rat)=27 mg/kg] and the hazard thereof at the time of handling are regarded as problematic, and therefore, instead of the above, various gas generating compositions containing nitrogen-containing organic compounds have been developed as safer non-azide gas generating compositions.

U.S. Pat. No. 4,909,549 discloses a composition comprising a hydrogen-containing tetrazole or triazole compound and an oxygen-containing oxidizing agent. U.S. Pat. No. 4,370,181 discloses a gas generating composition comprising a hydrogen-free bitetrazole metal salt and an oxygen-free oxidizing agent. U.S. Pat. No. 4,369,079 discloses a gas generating composition comprising a hydrogen-free bitetrazole metal salt and, an alkali metal nitrate, an alkali metal nitrite, an alkaline earth metal nitrate, an alkaline earth metal nitrite or a mixture thereof. U.S. Pat. No. 5,542,999 discloses a gas generating composition comprising a fuel such as GZT, TAGN, NG (nitroguanidine) or NTO, basic copper nitrate, a catalyst reducing a toxic gas, and a coolant. JP-A 10-72273 discloses a gas generating composition comprising a bitetrazole metal salt, a bitetrazole ammonium salt, or aminotetrazole, and ammonium nitrate.

The structure of the inflator for an air bag has to be optimized in accordance with the properties of the gas generating agent to be used, or the like. WO-A 00/50273 discloses an inflator which uses a non-azide gas generating composition forming less solid residues, specifically, a gas generating composition comprising 54 to 67% of guanidine nitrate and 33 to 46% of an oxidizing agent comprising ammonium perchlorate and sodium nitrate, and does not including a filter. U.S. Pat. No. 6,143,102 discloses in Table 2 that slag can be recovered as solids by adding alumina and silica. In addition, JP-A 11-503104, U.S. Pat. No. 6,126,197, etc. are known.

However, the non-azide, gas generating compositions described above are problematic in the combustion flame temperature, burning rate, phase transition, a generated amount of carbon monoxide and nitrogen oxides, and gas output. When the gas generating composition in U.S. Pat. No. 4,369,079 is actually used, a large amount of a coolant is necessary because of its high combustion flame temperature. The composition in U.S. Pat. No. 5,542,999 may not be completely combustible in a short time because of its low burning rate. In the gas generating agent in JP-A 10-72273, its molded article may be broken by a change in the shape due to the phase transition of ammonium nitrate in the temperature range used, thus failing to achieve stable combustion. In the prior art relating to the non-azide gas generating agent described above, a fuel such as tetrazoles, nitroguanine or TAGN is used, but all of these compounds belong to dangerous substances and require sufficient attention at the time of handling.

WO-A 00/50273 discloses an inflator without a filter by reducing an amount of solids (combustion residues) (disclosed to be reduced to preferably 15% or less) formed upon combustion of the gas generating composition. If combustion residues are released into an airbag, an accident such as damage to the airbag may occur, but in this prior art, the majority of the gas generating composition is converted into a gas by combustion, thus reducing the necessity for separation of combustion residues from the combustion gas by a filter. It is estimated that a generated amount of such combustion residues is influenced by an amount or type of the metal component contained in the gas generating composition. A member corresponding to a filter is not shown in drawings in JP-A 11-503104 and U.S. Pat. No. 6,126,197 wherein like WO-A 00/50273, the amount of the metal component contained in the gas generating agent used is low, thus reducing a generated amount of combustion residues and making a filter unnecessary. When succeeding in making a filter unnecessary, the demand for miniaturization and weight reduction of the inflator can be fulfilled.

U.S. Pat. No. 6,143,102 discloses that slag is recovered as solids by adding alumina and silica, but does not disclose that a filter can be eliminated.

DISCLOSURE OF INVENTION

An object of the present invention is to provide an inflator for an air bag capable of downsizing and weight-reduction by using a molded article of a gas generating composition in which a combustion gas can be easily separated from combustion residues, and an air bag apparatus using the same.

The present inventors made extensive study from the viewpoint of facilitating the separation of a combustion gas from combustion residues generated upon combustion of a gas generating agent without using a conventional high-density and thick filter or coolant with a large pressure loss in the combustion gas. As a result, the present inventors found a means for easily separating a combustion gas from combustion residues not by reducing an amount of combustion residues to reduce an amount of fine combustion residues (mist) as shown in WO-A 00/50273, but by positively permitting combustion residues with less mist to remain while securing an amount of a generated gas enough to expand and develop an airbag, and the present invention was thereby completed.

As a means of solving the problem, the present invention provides an inflator for an air bag comprising, in a housing having a gas discharging port, a combustion chamber accommodating a molded article of a gas generating composition which is burnt to generate a gas and an ignition means to ignite the molded article of a gas generating composition, wherein the molded article of the gas generating composition contains a metal component and meets the following requirements (A) and (B):

(A) the (theoretical) combustion flame temperature of the molded article of the gas generating composition is 2000° C. or less, and part or the whole of the metal or metal oxide after combustion of the molded article of the gas generating composition has a melting point not lower than the combustion flame temperature; and (B) bulk combustion residues remain in the combustion chamber at the time of combustion of the molded article of the gas generating composition.

As another means for solving the problem, the present invention provides an inflator for an air bag comprising, in a housing having a gas discharging port, a combustion chamber accommodating a molded article of a gas generating composition which is burnt to generate a gas and an ignition means to ignite the molded article of a gas generating composition, wherein a porous dividing member is arranged between the gas discharging port and the molded article of the gas generating composition, the combustion gas is discharged via the dividing member from the gas discharging port, and the molded article of the gas generating composition contains a metal component and meets the following requirements (A) and (B):

(A) the (theoretical) combustion flame temperature of the molded article of the gas generating composition is 2000° C. or less, and part or the whole of the metal or metal oxide after combustion of the molded article of the gas generating composition has a melting point not lower than the combustion flame temperature; and (B) bulk combustion residues remain in the combustion chamber at the time of combustion of the molded article of the gas generating composition.

In the present invention, the "combustion chamber" means a chamber accommodating the gas generating agent it self. In the present invention, the "metal" means either one of a metal and a semimetal, or both of a metal and a semimetal. In the present invention, the "(theoretical) combustion flame temperature" is based on theoretical calculation. In the present invention, the "metal or metal oxide after combustion of the molded article of the gas generating composition" refers not only to a metal or metal oxide generated upon combustion, but also to a metal or metal oxide (e.g. silica and alumina) not changing before and after combustion.

In the respective inventions, when the requirement (A) is met, combustion residues are easily formed, while as prescribed in the requirement (B), combustion residues are easily made bulky. In the present invention, the "bulk combustion residues" excludes combustion residues (mist) in the form of fine powders which are easily discharged from the inflator, and the shape of the residues is not limited.

In the requirement (A), the actual combustion flame temperature of the gas generating agent is lower than the theoretical value because of heat diffusion to the outside of the inflator. Thus, even if the melting point of the combustion residues (metal or metal oxide) is the same as the theoretical combustion flame temperature, the melting point is sufficiently higher than the actual combustion flame temperature. The (theoretical) combustion flame temperature in the requirement (A) is preferably 1800° C. or less, more preferably 1600° C., still more preferably 1400° C. and further more preferably 1200° C. or less, and the lower limit of the combustion flame temperature is preferably 800° C., and more preferably 900° C. In the range where the functions of the inflator for an air bag are not deteriorated, a lower combustion flame temperature of the molded article of the gas generating composition is preferable because combustion resides can be easily formed and the necessity for cooling the combustion gas can be reduced.

In the requirement (A), in the metal or metal oxide of the molded article after combustion of the gas generating composition, the metal or metal oxide having a higher melting point than the combustion flame temperature of the molded article of the gas generating composition is not less than 2% by weight, more preferably not less than 5% by weight, still more preferably 50% by weight, and further more preferably 90% by weight. When the higher this ratio is, the more easily bulk combustion residues are formed.

In the requirement (A), the metal or metal oxide after combustion of the molded article of the gas generating composition is preferably copper, silica, alumina, cobalt oxide, iron oxides ($Fe_2O_3$, FeO and $Fe_3O_4$), strontium oxide, barium oxide, calcium oxide, magnesium oxide, titanium oxide, tungsten oxide, or a combination of an alkaline earth metal oxide and silica. The metal or metal oxide is derived from (a) a fuel, (b) an oxidizing agent, (c) a binder and (d) an additive, and for example, when the fuel is hexamine cobalt (III) nitrate (HACN), the metal oxide is cobalt oxide, and when the oxidizing agent is basic copper nitrate, the metal is copper.

In the requirement (B), the shape of the molded article of the gas generating composition is preferably approximate to the shape of bulk combustion residues. When there is no or less change in the shape of the molded article of the gas generating composition after combustion, it means that fine combustion residues (mist) are not generated or hardly generated. Accordingly, the inflow of mist into an airbag is prevented or depressed.

In the requirement (B), the ratio (weight ratio) of the amount of the bulk combustion residues to the amount of the molded article of the gas generating composition before combustion is preferably 10% or more, more preferably 20% or more, still more preferably 30% or more, and the upper limit of this ratio is preferably 60%. A ratio in the range of 10 to 60% is preferable in order to generate a gas enough to expand an airbag and to generate bulk combustion residues, preferably bulk combustion residues having an approximate shape before and after combustion.

In the requirement (B), the ratio (weight ratio) of the amount of the bulk combustion residues to the theoretical amount of residues is preferably 50% or more, more preferably 80% or more, still more preferably 90% or more, and further more preferably 95% or more. Here, the "theoretical amount of residues" is the sum by weight of the metal, metal oxide (including a metal complex oxide) etc. which exclude a gaseous product formed upon combustion of (a) a fuel, (b) a metal-containing oxidizing agent, (c) a binder and (d) an additive constituting the molded article of the gas generating composition.

The content of the metal in the molded article of the gas generating composition used in the present invention is preferably 20 to 50% by weight, and more preferably 20 to 45% by weight. A metal content of 20 to 50% by weight is desirable because bulk combustion residues, preferably bulk combustion residues having an approximate shape before and after combustion are easily formed.

By satisfying these numerical requirements in the present invention, the bulk combustion residues, preferably bulk combustion residues having an approximate shape before and after combustion, can be easily formed, and the molded article of the gas generating composition after combustion is in a porous form whose outer appearance is maintained by the metal component remaining after gasified components were removed as a gas.

The porous dividing member used in the present invention can be formed into a single-layer body or a laminated body consisting of two or more layers having different functions. The single-layer body or laminated body can be selected depending on the combustion flame temperature attributable to the composition of the molded article of the gas generating composition, easiness of formation of combustion residues, etc.

In the present invention, when the porous dividing member consists of a single layer, the porous dividing member is desirably a supporting member having a first leakage preventing function of preventing leakage of the molded article of the gas generating composition from the gas discharging port at least before and during combustion. Further, the supporting member is more desirably the one having a second leakage preventing function of preventing leakage of the combustion residues from the gas discharging port during and after combustion.

In the invention described above, when the porous dividing member consists of a laminated body of two or more layers, the porous dividing member can have one, two or three members selected from the group consisting of a retaining member for fixing the supporting member, a protecting member for preventing deformation of the supporting member and a coolant for cooling the combustion gas, in addition to the supporting member having the first leakage preventing function or the first and second leakage preventing functions.

The retaining member is to provide not only a function of supporting and fixing the supporting member but also a function of preventing leakage of a combustion gas between the supporting member and the inner wall of the housing. The protecting member is arranged radially outside the supporting member, to prevent the expansion and deformation of the supporting member caused by a pressure of a combustion gas, and the coolant is arranged radially inside or outside the supporting member, to exhibit a function of cooling the combustion gas.

As the supporting member and coolant, those consisting of a single- or multiple-layered plain-dutch wire mesh, a single- or multiple-layered plain-weave wire mesh, plain-stitch wire mesh, lath metal (expanded metal), punched metal or the like can be used. The retaining member and the protecting member are not particularly limited insofar as they are excellent in breathability in a form capable of exhibiting their functions, and punched metal or the like can be used.

When the porous dividing member is produced in the form of a laminated body of two or more layers, it is possible to use not only a laminated body formed by combining two or more independent members but also a laminated body consisting of one member containing two or more layers, that is, a member wherein two or more layers having different functions are integrated into one piece.

The laminated body is combined in the following manner: (i) the retaining member is arranged inside the supporting member; (ii) the protecting member is arranged outside the supporting member; (iii) the coolant is arranged inside or outside the supporting member; (iv) the retaining member is arranged inside the supporting member, while the protecting member or coolant is arranged outside the supporting member; (v) the protecting member is arranged outside the supporting member, while the coolant is arranged inside the supporting member; (vi) the retaining member and the coolant are arranged inside the supporting member, while the protecting member is arranged outside the supporting member, (vii) the retaining member arranged inside the supporting member, while the protecting member and the coolant are arranged outside the supporting member. In the present invention, the supporting member may be excluded from the modes (i) to (vii) above, or the supporting member can be provided with filtering functions.

The structure of the porous dividing member consisting of the single layer or laminated body described above is suitably determined depending on the combustion flame temperature attributable to the composition of the molded article of the gas generating composition, easiness of formation of combustion residues, etc. For example, when the combustion flame temperature of the molded article of the gas generating composition is low, the coolant can be made unnecessary or simplified, and when bulk combustion residues are easily formed, the leakage-preventing function of the supporting member can be made unnecessary or simplified.

In the invention described above, the porous dividing member can be a member substantially not cooling a combustion gas. The member substantially not cooling the combustion gas excludes the one intended for use in positive cooling (for example, a member having coolant functions) other than slight cooling of the combustion gas in contact with the metallic supporting member etc.

In the invention, the pressure loss, of the combustion gas, to the porous dividing member, is 10 kPa or less more preferably 5 kPa or less and still more preferably 1 kPa or less in the atmosphere at 20° C. to 1000 L/min of air stream, or most preferably, there is no substantially pressure loss. A lower lose in this pressure means that the mist to be removed is less formed so that filtering functions can be made unnecessary or simplified, and also means that the coolant functions are low.

The pressure loss is measured according to FIG. 8 in column 0067 in JP-B No. 2926040. As the member causing such pressure loss, for example members (filter, coolant) corresponding to the dividing member causing a pressure loss of 10 kPa or less are disclosed in the columns 38, 39, 89 and the drawings in JP-B No. 2926040, and those members corresponding to the dividing member causing a pressure loss of 1 kPa or less are disclosed in WO-A 01/62558.

In the present invention, there is preferably a gap between the porous dividing member and the gas discharging port. By such constitution, it is possible to prevent the combustion gas from being concentrated in the dividing member in a position opposite to the gas discharging port.

The molded article of the gas generating composition according to the present invention can make use of the one containing a metal component, meeting the requirements (A) and (B), and containing other components if necessary. The metal component may be contained in the molded article of the gas generating composition, that is, in the fuel, the oxidizing agent or other components.

The molded article of the gas generating composition used in the present invention is preferably the one consisting of a non-azide gas generating agent containing (a) a fuel and (b) a metal-containing oxidizing agent.

The fuel as the (a) component is preferably a nitrogen-containing compound such as a triazine derivative, a triazole derivative, a tetrazole derivative, a guanidine derivative, an azodicarbonamide derivative or a hydrazine derivative.

The fuel as the (a) component is preferably a triazine derivative because of its low toxicity, low combustion flame temperature and high burning rate in combination with the (b) component. The triazine derivative is at least one member selected from the group consisting of triazine (1,2,3-triazine, 1,2,4-triazine, 1,3,5-triazine), melamine, trihydrazinotriazine, trimethylol melamine, alkylated methylol melamine, ammeline, ammelide, ammeland, cyanuric acid, cyanuric acid derivatives such as cyanuric esters, melam, melem, melamine nitrate, melamine perchlorate, and nitrated melamine such as dinitroammeline.

The fuel as the (a) component, that is, the triazole derivative, tetrazole derivative, guanidine derivative, azodicarbonamide derivative and hydrazine derivative include 5-oxo-1,2,4-triazole, tetrazole, 5-aminotetrazole, 5,5'-bi-1H-tetrazole, guanidine, nitroguanidine, cyanoguanidine, triaminoguanidine nitrate, guanidine nitrate, guanidine carbonate, burette, azodicarbonamide, carbohydrazide, carbohydrazide nitrate complexes, dihydrazide oxalate and hydrazine nitrate complexes.

Among those described above, melamine and trihydrazinotriazine (THT) are preferable because these compounds having an LD50 (oral-rat) of 3161 mg/kg are excellent in combustion stability, safe at the time of handling, and inexpensive.

The oxidizing agent as the (b) component is preferably an oxygen-containing oxidizing agent and includes at least one member selected from the group consisting of an oxy acid salt, a metal oxide, a metal complex oxide, a metal peroxide and a basic metal nitrate, among which the basic metal nitrate is preferable.

The oxy acid salt includes the one consisting of a cation selected from ammonium, an alkali metal and an alkaline earth metal and a hydrogen-free anion selected from nitric acid, nitrous acid, chloric acid and perchloric acid.

The oxy acid salt includes, for example, ammonium nitrate, an alkali metal nitrate or an alkaline earth metal nitrate such as ammonium nitrate, sodium nitrate, potassium nitrate, magnesium nitrate or strontium nitrate; ammonium nitrite, an alkali metal nitrite or an alkaline earth metal nitrite such as ammonium nitrite, sodium nitrite, potassium nitrite, magnesium nitrite or strontium nitrite; ammonium chlorate, an alkali metal chlorate or an alkaline earth metal chlorate such as ammonium chlorate, sodium chlorate, potassium chlorate, magnesium chlorate or barium chlorate; and ammonium perchlorate, an alkali metal perchlorate or an alkaline earth metal perchlorate such as ammonium perchlorate, sodium perchlorate, potassium perchlorate, magnesium perchlorate or barium perchlorate.

The metal oxide, metal peroxide and metal complex oxide include oxides, peroxides or complex oxides of copper, cobalt, iron, manganese, nickel, zinc, molybdenum or bismuth.

Such metal oxide, metal peroxide and metal complex oxide include, for example, $CuO$, $Cu_2O$, $CO_2O_3$, $CoO$, $CO_3O_4$, $Fe_2O_3$, $FeO$, $Fe_3O_4$, $MnO_2$, $Mn_2O_3$, $Mn_3O_4$, $NiO$, $ZnO$, $MoO_3$, $CoMoO_4$, $Bi_2MoO_6$ and $Bi_2O_3$.

The basic metal nitrates are a series of compounds represented by the formula below. Some compounds can also include hydrates.

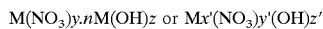

$$M(NO_3)y.nM(OH)z \text{ or } Mx'(NO_3)y'(OH)z'$$

wherein M represents a metal, x' represents the number of metals, y and y' each represent the number of $NO_3$ ions, z' represents the number of OH ions, and n represents the ratio of the $M(OH)z$ moiety to the $M(NO_3)y$ moiety.

The compound of the above formulae is at least one member selected from the group consisting of basic copper nitrates $[Cu_2(NO_3)(OH)_3, Cu_3(NO_3)(OH)_5.2H_2O]$, basic cobalt nitrate $[CO_2(NO_3)(OH)_3]$, basic zinc nitrate $[Zn_2(NO_3)(OH)_3]$, basic manganese nitrate $[Mn(NO_3)(OH)_2]$, basic iron nitrate $[Fe_4(NO_3)(OH)_{11}.2H_2O]$, basic molybdenum nitrate, basic bismuth nitrate $[Bi(NO_3)(OH)_2]$ and basic cerium nitrate $[Ce(NO_3)_3(OH).3H_2O]$, containing copper, cobalt, zinc, manganese, iron, molybdenum, bismuth or cerium as the metal M. Among them, the basic copper nitrates are preferable.

As compared with ammonium nitrate as the oxidizing agent, the basic copper nitrates are free of phase transition in the temperature range used and have a high melting point, and are thus superior in thermal stability. Further, the basic copper nitrates act to lower the combustion flame temperature of the gas generating agent, thus achieving a reduction in the amount of nitrogen oxides formed.

When the molded article of the gas generating composition used in the present invention comprises the (a) component and the (b) component, the content of the (a) component is preferably 5 to 60% by weight, more preferably 5 to 50% by weight, and further more preferably 10 to 30% by weight, and the content of the (b) component is preferably 40 to 95% by weight, more preferably 50 to 95% by weight, and further more preferably 70 to 90% by weight.

One preferable embodiment of the molded article of the gas generating composition comprising the (a) component and the (b) component is the one comprising (a) melamine and (b) basic copper nitrate. In this case, the content of (a) melamine is 15 to 45% by weight, and preferably 15 to 25% by weight, and the content of (b) basic copper nitrate is 55 to 85% by weight, and preferably 75 to 85% by weight.

Another preferable embodiment of the molded article of the gas generating composition comprising the (a) component and the (b) component is the one comprising (a) trihydrazinotriazine and (b) basic copper nitrate. In this case, the content of (a) trihydrazinotriazine is 15 to 45% by weight, and preferably 15 to 25% by weight, and the content of (b) basic copper nitrate is 55 to 85% by weight, and preferably 75 to 85% by weight.

The molded article of the gas generating composition used in the present invention can further incorporate the binder as the (c) component in order to increase the strength of the molded article.

The binder is at least one member selected from the group consisting of carboxymethyl cellulose (CMC), carboxymethyl cellulose sodium salt (CMCNa), carboxymethyl cellulose potassium salt, carboxymethyl cellulose ammonium salt, cellulose acetate, cellulose acetate butyrate (CAB), methyl cellulose (MC), ethyl cellulose (EC), hydroxyethyl cellulose (HEC), ethyl hydroxyethyl cellulose (EHEC), hydroxypropyl cellulose (HPC), carboxymethyl ethyl cellulose (CMEC), fine crystalline cellulose, polyacrylamide, aminated polyacrylamide, polyacryl hydrazide, acrylamide-metal acrylate copolymers, a copolymer of polyacrylamide and polyacrylate, polyvinyl alcohol, acrylic rubber, guar gum, starch and silicone. Among these, the carboxymethyl cellulose sodium salt (CMCNa) and guar gum are preferable in consideration of adhesion, price, ignitability etc.

Further, the molded article of the gas generating composition used in the present invention can incorporate the additive as the (d) component in order to reduce the combustion flame temperature, to facilitate formation of combustion residues and to reduce an amount of toxic nitrogen oxides, carbon monoxide etc. after combustion.

The additive is at least one member selected from a metal oxide selected from the group consisting of copper oxide, iron oxide, zinc oxide, cobalt oxide, manganese oxide, molybdenum oxide, nickel oxide, bismuth oxide, silica and alumina; a metal hydroxide selected from the group consisting of aluminum hydroxide, cobalt hydroxide and iron hydroxide; a metal carbonate or a basic metal carbonate selected from the group consisting of cobalt carbonate, calcium carbonate, basic zinc carbonate and basic copper carbonate; a complex compound of metal oxide or metal hydroxide selected from the group consisting of Japanese acid clay, kaolin, talc, bentonite, diatomaceous earth and hydrotalcite; a metal acid salt selected from the group consisting of sodium silicate, mica, molybdate, cobalt molybdate and ammonium molybdate, silicone, molybdenum disulfide, calcium stearate, silicon nitride, silicon carbide and a catalyst having a metal such as ruthenium carried on alumina or silica.

Either one of the binder as the (c) component and the additive as the (d) component can be incorporated. Both may be combined together.

When the molded article of the gas generating composition used in the present invention comprises components (a), (b) and (c) and/or (d), the content of the (a) component is preferably 5 to 60% by weight, and more preferably 10 to 25% by weight, the content of the (b) component is preferably 40 to 95% by weight, more preferably 40 to 85% by weight, and still more preferably 50 to 80% by weight, the content of the (c) component is preferably 0.1 to 15% by weight, and more preferably 1 to 10% by weight, and the content of the (d) component is preferably 0.1 to 20% by weight, and more preferably 3 to 15% by weight.

One preferable embodiment of the molded article of the gas generating composition comprising the components (a), (b) and (c) is the one comprising (a) melamine, (b) basic copper nitrate and (c) carboxymethyl cellulose sodium salt. In this case, it is preferable that the content of (a) melamine is 15 to 25% by weight, the content of (b) basic copper nitrate is 60 to 80% by weight, and the content of (c) carboxymethyl cellulose sodium salt is 0.1 to 10% by weight.

Another preferable embodiment of the molded article of the gas generating composition comprising the components (a), (b) and (c) is the one comprising (a) melamine, (b) basic copper nitrate and (c) guar gum. In this case, it is preferable that the content of (a) melamine is 15 to 25% by weight, the content of (b) basic copper nitrate is 60 to 80% by weight, and the content of (c) guar gum is 0.1 to 10% by weight.

Still another preferable embodiment of the molded article of the gas generating composition comprising the components (a), (b) and (c) is the one comprising (a) trihydrazinotriazine, (b) basic copper nitrate and (c) guar gum. In this case, it is preferable that the content of (a) trihydrazinotriazine is 15 to 25% by weight, the content of (b) basic copper nitrate is 60 to 80% by weight, and the content of (c) guar gum is 0.1 to 10% by weight.

One preferable embodiment of the molded article of the gas generating composition comprising the components (a), (b) (c) and (d) is the one comprising (a) melamine, (b) basic copper nitrate, (c) carboxymethyl cellulose sodium salt and (d) aluminum hydroxide. In this case, it is preferable that the content of (a) melamine is 10 to 25% by weight, the content of (b) basic copper nitrate is 60 to 80% by weight, the content of (c) carboxymethyl cellulose sodium salt is 0.1 to 10% by weight, and the content of (d) aluminum hydroxide is 1 to 15% by weight.

Another preferable embodiment of the molded article of the gas generating composition comprising the components (a), (b), (c) and (d) is the one comprising (a) melamine, (b) basic copper nitrate, (c) carboxymethyl cellulose sodium salt and (d) cobalt oxide. In this case, it is preferable that the content of (a) melamine is 10 to 25% by weight, the content of (b) basic copper nitrate is 60 to 80% by weight, the content of (c) carboxymethyl cellulose sodium salt is 0.1 to 10% by weight, and the content of (d) cobalt oxide is 1 to 10% by weight.

Still another preferable embodiment of the molded article of the gas generating composition comprising the components (a), (b), (c) and (d) is the one comprising (a) melamine, (b) basic copper nitrate, (c) guar gum and (d) aluminum hydroxide. In this case, it is preferable that the content of (a) melamine is 10 to 25% by weight, the content of (b) basic copper nitrate is 60 to 80% by weight, the content of (c) guar gum is 0.1 to 10% by weight, and the content of (d) aluminum hydroxide is 1 to 10% by weight.

A further other preferable embodiment of the molded article of the gas generating composition comprising the components (a), (b), (c) and (d) is the one comprising (a) trihydrazinotriazine, (b) basic copper nitrate, (c) guar gum and (d) aluminum hydroxide. In this case, it is preferable that the content of (a) trihydrazinotriazine is 10 to 25% by weight, the content of (b) basic copper nitrate is 60 to 80% by weight, the content of (c) guar gum is 0.1 to 10% by weight, and the content of (d) aluminum hydroxide is 1 to 10% by weight.

The molded article of the gas generating composition used in the present invention can be molded in a desired shape, for example in the form of a cylinder, a single-perforated cylinder, a perforated cylinder, a doughnut or a pellet. The molded article can be produced by adding water or an organic solvent to the gas generating agent, then mixing them, and extrusion-molding the mixture (molded product in the form of a single-perforated cylinder or a perforated cylinder) or compression-molding the mixture (molded product in the form of a pellet) by a tabletting machine or the like.

In the inflator of the invention, the coolant member for cooling a combustion gas can be simplified (that is, its weight or volume can be reduced due to a reduction in density, a reduction in thickness, etc.) depending on the combustion flame temperature in the requirement (A), as descried above, and when the combustion flame temperature is 120° C. or less, the coolant member can be substantially eliminated, thus reducing the weight and volume of the inflator and achieving a reduction in costs. Further, the filter can be simplified (that is, its weight or volume can be reduced due to a reduction in density, a reduction in thickness, etc.) or eliminated, thus enabling a significant reduction in cost as well. In addition, the coolant can be eliminated while the filter can be eliminated or miniaturized so that the diameter of the gas generator can be significantly reduced and the gas generator can be miniaturized. In the present invention, the gas generating agent using a triazine derivative such as melamine shows a high burning rate and a very small pressure index (for example 0.1 to 0.3) and thus depends less on pressure dependence, to achieve the advantage of very easy regulation of combustion of the gas generating agent.

The inflator for an air bag of the invention can be used as e.g. an inflator for an air bag for a driver side, an inflator for an air bag for a passenger side next to a driver, an inflator for a side airbag, an inflator for an inflatable curtain, an inflator for a knee bolster, an inflator for an inflatable seat belt, an inflator for a tubular system and a gas generator for a pretensioner in various vehicles.

The inflator in the case of a pyrotechnic inflator releasing only a gas generated by combustion may be a single type inflator in which a single space accommodating the molded article of the gas generating composition and a single igniter are provided in the housing, or a dual type inflator in which two spaces accommodating the molded article of the gas generating composition and one or two igniters are provided. Alternatively, the inflator can be an inflator in a single cylindrical form not having an internal cylindrical member for accommodating the ignition means.

The inflator of the invention may be either a pyrotechnic type in which a gas is fed from only the molded article of the gas generating composition or a hybrid type in which a gas is fed from both a compressed gas such as argon, and the gas generating agent.

As another means for solving the problem described above, the present invention provides an air bag apparatus including the above-described inflator for an air bag, an impact sensor which upon sensing impact, actuates the inflator, an airbag which expands by introducing a gas generated in the inflator into the airbag, and a module case accommodating the airbag.

In the inflator for an air bag of the present invention, the molded article of the gas generating composition which meets the requirements (A) and (B) is used. As a result, a coolant for cooling a gas generated by combustion of the molded article of the gas generating composition can be made unnecessary or simplified and a filter for purifying a gas can be made unnecessary or simplified, thus realizing an inflator having a smaller size, lighter weight and lower cost.

PREFERRED EMBODIMENTS OF THE INVENTION

Figure 1:
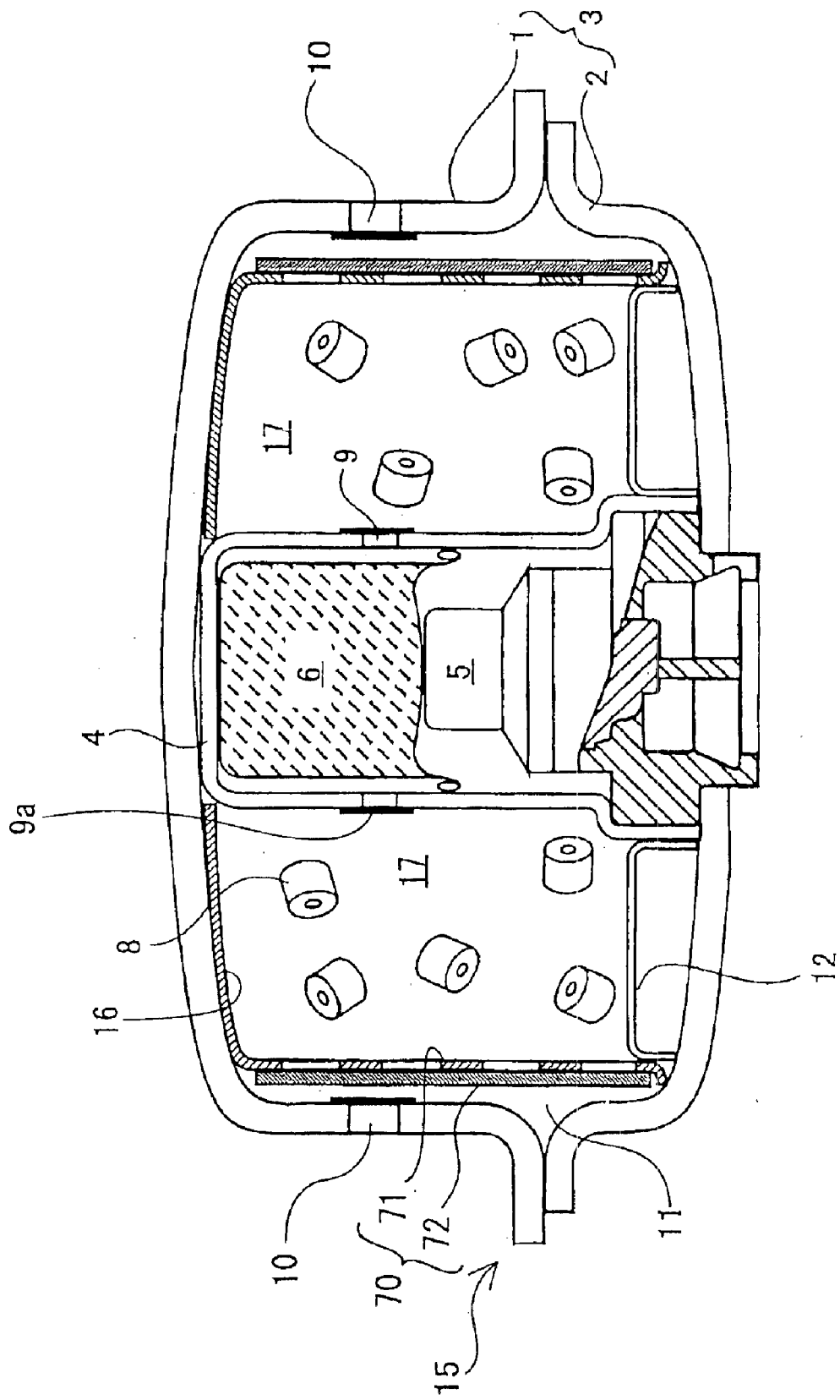
FIG. 1 is a vertical cross-sectional view showing an embodiment of an inflator.

Hereinafter, embodiments of an inflator for an air bag of the present invention are described with reference to the drawings. FIG. 1 is a vertical cross-sectional view of the inflator in this embodiment, which has a structure particularly suitable for arranging in a driver side.

In this inflator, a diffuser shell 1 having a gas discharging port 10 and a closure shell 2 which forms the inner space together with the diffuser shell 1 are joined at a flange 15 to form a housing 3, and the housing 3 is provided therein with a partition wall member 4 in a substantially cylindrical shape with a top.

An ignition means for actuating the inflator is provided inside the partition wall member 4. In this embodiment, the ignition means includes an igniter 5 which is actuated upon receiving an electrical activation signal and a transfer charge 6 which is ignited and burnt by the actuation of the igniter to burn a molded article 8 of the gas generating composition.

An annular space 17 formed to surround the partition wall member 4 is charged with the molded article 8 of the gas generating composition, for being burnt and generating a gas, which meets the requirements (A) and (B). The molded article 8 of the gas generating composition is ignited by flames of the transfer charge 6 which are ejected from a flame-transferring port 9 arranged in the partition wall member 4. The molded article 8 of the gas generating composition charged in the annular space 17 is supported by a ring-shaped plate member 12 arranged in the closure shell 2 side so that the article is prevented from being broken due to vibration.

Between the gas discharging port 10 and a molded article 8 of the gas generating composition filled in the annular space 17 (which corresponds to a chamber storing a molded article 8 of the gas generating composition as well as a combustion chamber in which a molded article 8 of the gas generating composition is burnt), a laminated body comprising a supporting member 72 and a retaining member 71 which corresponds a porous dividing member 70 (hereinafter, referred to as "dividing member") is provided. The supporting member 72 is formed by winding a plain-dutch wire mesh once. A combustion gas generated by the combustion of the molded article 8 of the gas generating composition is discharged from the gas discharging port 10 after passing through the retaining member 71 and the supporting member 72.

The supporting member 72 has a first leakage-preventing function for preventing the molded article 8 of the gas generating composition from being leaked out of the gas discharging port 10 before and during combustion, as well as a second leakage-preventing function for preventing combustion residues, having a shape approximate to that of the molded article 8 of the gas generating composition before combustion, from being leaked out of the gas discharging port 10 during and after combustion. A size and number of openings possessed by the supporting member 72 are determined depending on a size and a shape of the molded article 8 of the gas generating composition to be used, a size and number of combustion residues, and the relationship with the above-described pressure loss.

The retaining member 71 has a flange 16 bent inwardly along the internal surface of the diffuser shell 1, and has a function for supporting and fixing the supporting member 72 and a function for preventing short-pass of a combustion gas passing between the axial end surface of the supporting member 72 and the inner wall surface of the housing 3 (in other words, a function for preventing the combustion gas from being discharged out of the gas discharging port 10 without passing through the supporting member 72).

The dividing member 70 (supporting member 72 and retaining member 71) does not cause a substantial pressure loss in a stream of a combustion gas, the pressure loss, of the combustion gas, is 0.1 kPa or less in the atmosphere at 20° C. to 1000 L/min of air stream, and there is no substantial pressure loss. The dividing member 70 (supporting member 72 and retaining member 71) does not positively arrest mist, but may arrest the whole or part of mist insofar as no substantial pressure loss is caused.

A gap 11 is formed axially outside the supporting member 72, that is, between the supporting member 72 and the inner peripheral surface of the housing 3. With the gap 11, a gas generated by combustion of the molded article 8 of the gas generating composition can be prevented from passing convergently through part of the supporting member 72 opposite to the gas discharging port 10. In this embodiment, the supporting member 72 substantially free of pressure loss is hardly deformed even upon passage of a gas, and thus a member provided outside to prevent expansion and deformation can be omitted or made simplified.

In the embodiment in FIG. 1, the dividing member 70 can comprise only the retaining member 71 without the supporting member 72. In this case, the retaining member 71 is provided with the first and second leakage-preventing functions.

Next, operation of the inflator shown in FIG. 1 is described. The igniter 5 is activated to ignite the transfer charge 6, and a flame of the transfer charge enters the flame-transferring hole 9 and ruptures a seal tape 9a, and then, is ejected into the combustion chamber (annular space) 17 to ignite and burn the molded article of the gas generating composition 8. Thereafter, the combustion gas passes through the supporting member 72 and is discharged from the gas discharging hole 10 to inflate and develop an air bag.

Since the molded article 8 of the gas generating composition meets the requirements (A) and (B), bulk combustion residues (slag) having a shape approximate to that of the molded article 8 of the gas generating composition are formed, and a generated amount of fine combustion residues (mist) is little. Accordingly, even if the supporting member 72 is made thin and light-weighted with less pressure loss, mist is hardly discharged out of the gas discharging port 10 and introduced into an airbag. When mist is generated, part or the whole of the mist may be arrested by the supporting member 72.

In the present inflator, a coolant or filter can be omitted or made simplified, so that reductions in the production cost, size and weight of the gas generator can be realized.

Figure 2:
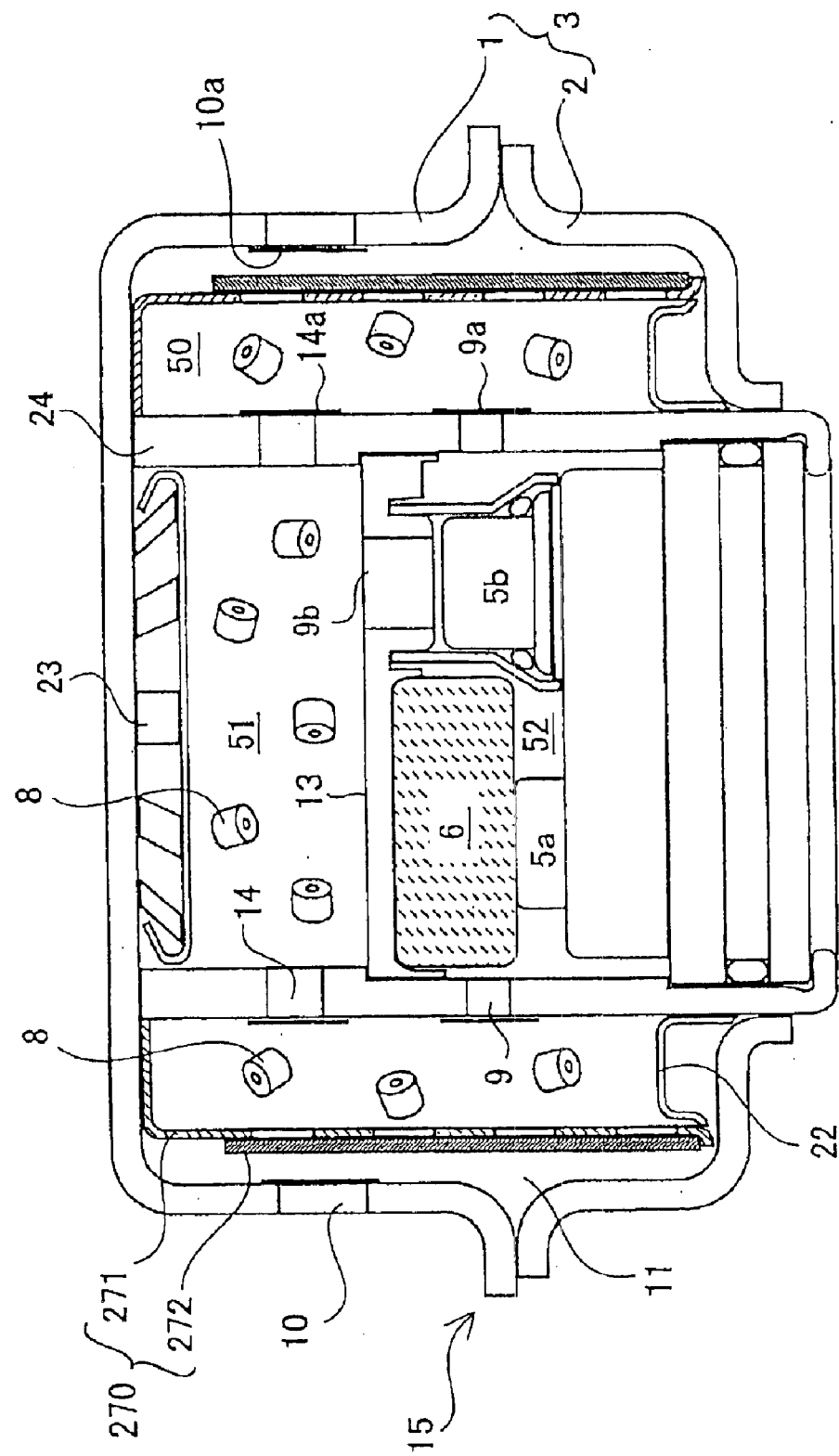
FIG. 2 is a vertical cross-sectional view showing another embodiment of the inflator.

Next another embodiment of the inflator of the present invention is described with reference to FIG. 2. FIG. 2 is a vertical cross-sectional view of an inflator for an air bag in another embodiment. The inflator shown in FIG. 2 also has a structure particularly suitable for arranging in a driver side. However, this inflator is different from the inflator shown in FIG. 1 in the respect that the space accommodating the molded article of the gas generating composition is divided into two sections.

In the inflator shown in FIG. 2, a housing 3 comprising a diffuser shell 1 and a closure shell 2 is divided into two chambers by an inner cylindrical member 24, and the inside of the inner cylindrical member 24 is divided into two chambers adjacent axially to each other by a partition wall 13 extending in the radial direction. As a result, in the inflator shown in FIG. 2, the interior of the housing 3 is divided into three chambers such as an annular space 50 axially outside the inner cylindrical member 24, an upper space 51 inside the inner cylindrical member 24, or a lower space 52 inside the inner cylindrical member 24.

The annular space 50 axially outside the inner cylindrical member 24 and the upper space 51 inside the inner cylindrical member 24 are charged with the molded article 8 of the gas generating composition which meets the requirements (A) and (B), while an ignition means is arranged in the lower space 52 inside the inner cylindrical member 24.

The molded article 8 of the gas generating composition, which is charged in the annular space (first combustion chamber) 50 axially outside the inner cylindrical member 24, is supported by a ring-shaped plate member 22 arranged in the closure shell 2 side, so that the molded article is prevented from being broken due to vibration. The molded article 8 of the gas generating composition, which is charged in the upper space (second combustion chamber) 51 inside the inner cylindrical member 24, is supported by a cushion member 23 arranged in the diffuser shell 1 side, so that the article is prevented from being broken due to vibration. In this embodiment, a leaf spring is used in the cushion member 23.

In this embodiment, as the ignition means arranged in the lower space 52 inside the inner cylindrical member 24, an ignition means including two electrical ignition type igniters 5a and 5b and a transfer charge 6 is used. In FIG. 2, the left small igniter is a first igniter 5a and the right large igniter is a second igniter 5b, so that the transfer charge 6 is arranged over the first igniter 5a.

A supporting member 272 is provided between a gas discharging port 10 and the molded article 8 of the gas generating composition charged in the first combustion chamber 50, and a retaining member 271 is provided inside the supporting member 272 to form a dividing member 270. The supporting member 272 is formed by winding a plain-dutch wire mesh once. A combustion gas generated by the combustion of the molded article 8 of the gas generating composition is discharged from the gas discharging port 10 after passing through the retaining member 271 and the supporting member 272. The supporting member 271 and the retaining member 272 have the same structure and functions as those in FIG. 1.

In the dual inflator having two combustion chambers as shown in FIG. 2, either of the two combustion chambers can be provided with a dividing member, but if the pressure loss of the dividing member is 10 kPa or less, or if the dividing member has no substantial pressure loss, the dividing member is arranged in one of the two combustion chambers, desirably in a gas discharging route in the combustion chamber in which the molded article of the gas generating composition is first combusted.

In the inflator shown in FIG. 2, the molded article 8 of the gas generating composition charged in the first combustion chamber 50 and the molded article 8 of the gas generating composition charged in the second combustion chamber 51 may be different in composition, shape, amount etc., insofar as they meet the requirements (A) and (B). In this case, the operation of the inflator can be adjusted more characteristically.

Next, operation of the inflator shown in FIG. 2 is described. The igniter 5a is activated to ignite the transfer charge 6, and a flame of the transfer charge passes through the first flame-transferring hole 9 and ruptures a seal tape 9a, and then, is ejected into the first combustion chamber 50. With this, the molded article of the gas generating composition 8 charged in the first gas generating chamber 50 is ignited and burnt to generate a gas for inflating an air bag.

Meanwhile, when the second igniter 5 is actuated simultaneously with or slightly later than the first igniter 5a, a flame thereof is ejected from a second flame-transferring port 9b arranged in the partition wall 13 towards the second combustion chamber 51, and then, the molded article 8 of the gas generating composition charged in the second combustion chamber 51 is ignited and burnt to generate a gas for inflating the airbag. The gas generated in the second combustion chamber 51 passes through a through-hole 14 provided in the inner cylindrical member 24 to break a seal tape 14a, and then ejected into the first combustion chamber 50.

The gases generated in the first combustion chamber 50 and the second combustion chamber 51 are discharged out of the gas discharging hole 10 via the supporting member 272 to expand and develop the air bag. Bulk combustion residues having a shape approximate to that of the molded article 8 of the gas generating composition are never discharged from the gas generating port 10 because of the action of the supporting member 272, as that in FIG. 1.

When the gas generated in the second combustion chamber 51 ruptures the seal tape 14a or collides with the inner wall of the inner cylindrical member 24 before reaching the supporting member 272, there occurs pressure loss, and when the gas ruptures the seal tape 10a sealing the gas discharging port 19, there further occurs pressure loss, however, this does not influence the relationship between the molded article 8 of the gas generating composition which meets the requirements (A) and (B) and the pressure loss of the dividing member 270 (supporting member 272 and retaining member 271).

As described above, even the inflator having two igniters and two combustion chambers as shown in FIG. 2 can achieve the same operational effect as that of the inflator shown in FIG. 1 by using the molded article of the gas generating composition which meets the requirements (A) and (B).

The inflator shown in FIG. 1 or 2 can be combined with an impact sensor, a control unit, a module case and an airbag (bag body) to form an airbag apparatus of the present invention.

The impact sensor can be constituted, for example, by a semiconductor type acceleration sensor. The control unit is provided with an ignition measuring circuit, and the signal from the semiconductor type acceleration sensor is inputted to the ignition measuring circuit. The control unit starts calculation when the impact signal from the sensor exceeds a certain value, and when the calculated result exceeds a certain value, it outputs an activating signal to the igniter of the inflator.

The module case is formed, for example, by polyurethane, and includes a module cover. The airbag and the inflator are stored in the module case so as to constitute as a pad module. The pad module is generally mounted to a steering wheel in the case of being mounted to the driver side of an automobile.

The airbag is made of nylon (for example, nylon 66), polyester or the like, and a bag port thereof surrounds the gas discharging port of the gas generator and is fixed to a flange portion of the gas generator in a folded state.

When the semiconductor type acceleration sensor in the airbag apparatus detects the impact at the time of collision of the automobiles, the signal is transmitted to the control unit, and the control unit starts calculation when the impact signal from the sensor exceeds a certain value. When the calculated result exceeds a certain value, it outputs the activating signal to the igniter of the inflator. Accordingly, the inflator is activated to generate a gas. The gas is ejected into the airbag, and thereby the airbag breaks the module cover to inflate, forming a cushion for absorbing the impact between the steering wheel and the driver.

EXAMPLES

The inflator of the present invention is described below in detail with reference to the examples. However, the present invention is not limited to these examples.

Example 1

A tank combustion test was conducted in accordance with the following method, using the inflator shown in FIG. 1. Here, an outer diameter of the housing excluding the flange was 60 mm and a height thereof was 33.5 mm, and the dividing member 70 comprising the supporting member 72 and the retaining member 71, the supporting member 71 formed by winding a plain-dutch wire mesh once was used, and the retaining member 71 was made of a punched metal.

The molded article of the gas generating composition used has a composition of melamine/basic copper nitrate/carboxymethyl cellulose Na/aluminum hydroxide=16.72/70.28/3/10 (% by weight)), is molded into a single-perforated cylinder (the outer diameter: 2.4 mm, the inner diameter: 0.7 mm, length: 2.0 mm) (theoretical value of the combustion flame temperature: 1019° C.), and 42 g of the molded article was charged into the inflator. As the transfer charge, 1.4 g of $B/KNO_3$ was used. In this case, the content of the metal in the molded article of the gas generating composition (referred to hereinafter as "metal content") was 41% by weight.
<Tank Combustion Test>

The inflator was fixed in a tank made of SUS (stainless steel) having the internal volume of 60 liter, and the tank was sealed at a room temperature and connected to an external ignition electric circuit. An increase in the pressure in the tank for 0 to 200 milliseconds starting from the time (=0) when an ignition current was applied by turning on the ignition electric circuit switch was measured by a pressure transducer separately arranged in the tank. Measurement data were processed by a computer to prepare a curve for evaluation of the operation behavior of the inflator as a tank pressure/time curve (referred to hereinafter as "tank curve"). After the combustion was finished, part of the gas in the tank may be removed and analyzed for gases such as CO or $NO_x$. Further, the housing in the inflator was provided with a pressure transducer, and simultaneously with measurement of the increase in the pressure in the tank, the increase in the pressure in the housing was also measured for 0 to 200 milliseconds, to prepare a housing internal pressure/time curve (referred to hereinafter as "combustion internal pressure curve"). In the tank combustion test, the tank curve is shown in FIG. 3, and the combustion internal pressure curve is shown in FIG. 4.

Figure 3:
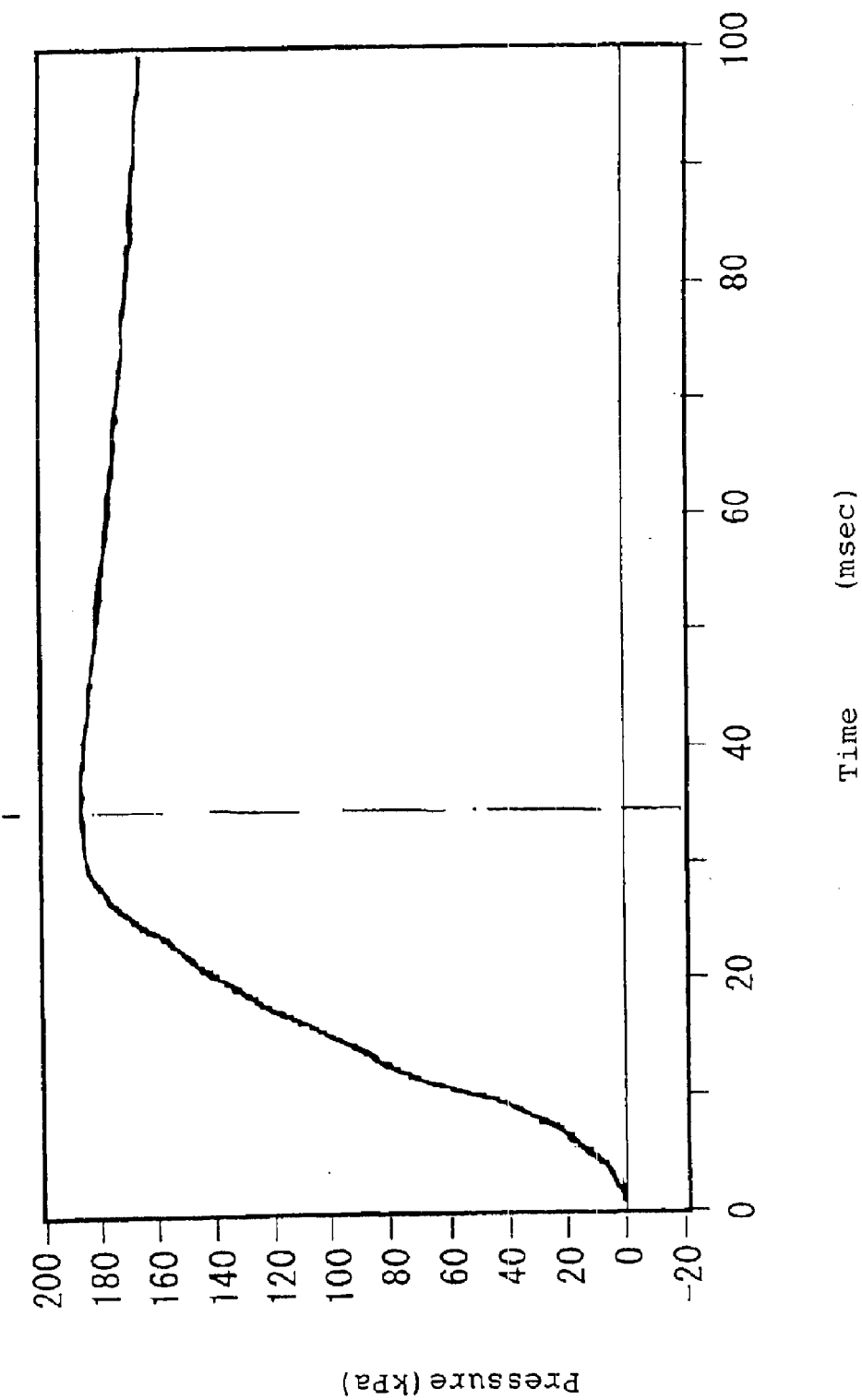
FIG. 3 is a tank curve in Example 1.
Figure 4:
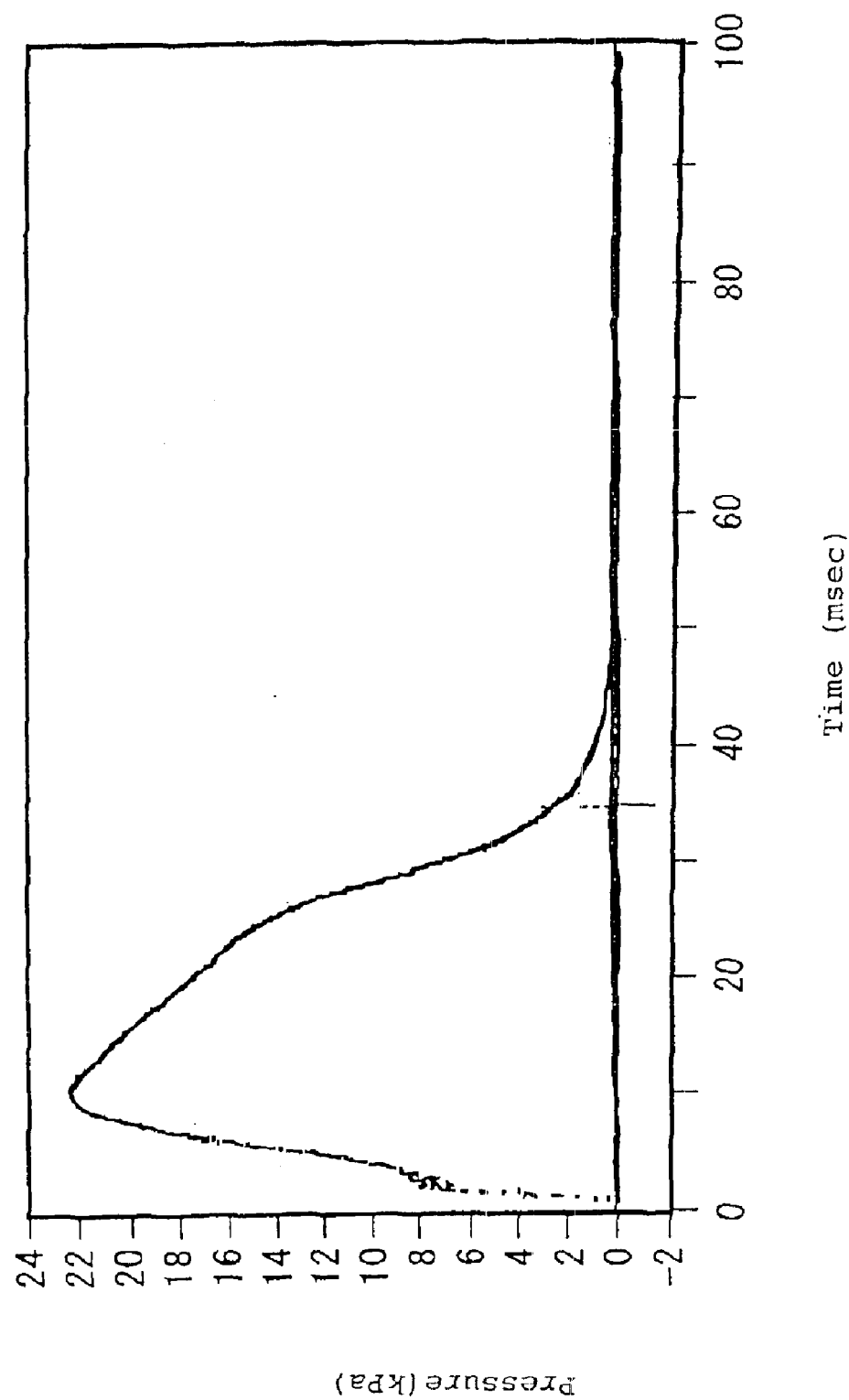
FIG. 4 is a combustion internal-pressure curve in Example 1.

As is evident from the tank curve in FIG. 3 and the combustion internal pressure curve in FIG. 4, the inflator for an air bag using the molded article of the gas generating composition which meets the requirements (A) and (B) can achieve satisfactory operation behavior even if the dividing member 70 (supporting member 72 and retaining member 71) having substantially no pressure loss (total pressure loss: about 0.1 kPa or less) shown in FIG. 1 is used in stead of the conventional filter and coolant of high density (i.e. causing high pressure loss). In the tank combustion test, the mist discharged out of the inflator was 1.0 g or less. It is estimated that upon combustion of the molded article of the gas generating composition, copper (melting point: 1084.5° C.) originating in basic copper nitrate is formed as metal; alumina (melting point: about 2015° C.) originating in aluminum hydroxide is formed as metal oxide; and sodium becomes mist. The various values of the molded article of the gas generating composition are as follows.

In the metal and metal oxide after combustion of the molded article of the gas generating composition, the ratio of those having a higher melting point than the combustion flame temperature to (referred to hereinafter as "the ratio of high-melting metals") is as follows: copper (84.4% by weight)+alumina (14.8% by weight)=99.2% by weight.

The ratio of the amount of bulk combustion residues ($W_1$) to the amount of the molded article of the gas generating composition before combustion ($W_1$) (ratio by weight) ($W_2$/$W_1$) (referred to hereinafter as "the first ratio of combustion residues") was 42%.

The ratio of the amount of bulk combustion residues (We) to the theoretical amount of residues ($W_1$) (ratio by weight) ($W_4$/$W_3$) (referred to hereinafter as "the second ratio of combustion residues") was 95% or more.

Figure 5:
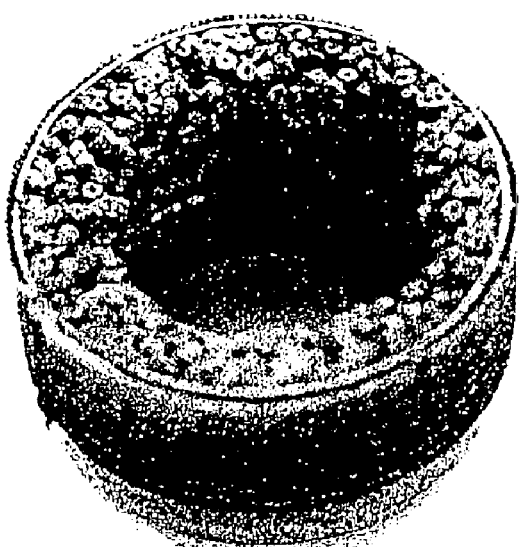
FIG. 5 is a photograph showing a state of combustion residues after combustion in Example 1.

When the inflator after the combustion test was dismantled and observed, it was confirmed that the combustion residues are maintained as a single-perforated (but porous) cylinder in the same form as before combustion, as is evident from the photograph of FIG. 5 (partial enlarged photograph of the inflator from which the retaining member 71 and the supporting member 72 were removed).

Comparative Example 1

An inflator was obtained in the same manner as in Example 1 except that nitroguanidine/strontium nitrate/carboxymethyl cellulose sodium salt/Japanese acid clay (34.3/49.5/9.4/6.7 (% by weight)) (theoretical combustion flame temperature=2098° C.) was used as the molded article of the gas generating composition.

Using the inflator, the same tank test as in Example 1 was conducted, and as a result, both the tank curve and the combustion internal pressure curve indicated a rapid increase. After the experiment, the inflator was dismantled and the inside was observed, and as a result, combustion residues hardly remained in the inflator. This rapid rise in the curves is considered attributable to the fact that during combustion, mists in a high-temperature state are leaked out from the inflator.

Example 2

An inflator (whose housing excluding a flange is 69 mm in outer diameter and 29 mm in height) shown in FIG. 1 in JP-B No. 2926040 was used, and the same molded article of the gas generating composition as in Example 1 was used. Further, the same dividing member as in the Examples in JP-B No. 2926040 was used in the inflator wherein a filter was integrated with a coolant (pressure loss: 3 kPa).

Figure 6:
FIG. 6 is a photograph showing a state of combustion residues after combustion in Example 2.

This inflator was examined in the same tank test as in Example 1, the inflator was then dismantled and observed, and the combustion residues were confirmed to be maintained as a single-perforated (but porous) cylinder in the same form as before combustion, as shown in the photograph of FIG. 6 (partial enlarged photograph of the inflator from which the coolant/filter was removed).

Comparative Example 2

Figure 7:
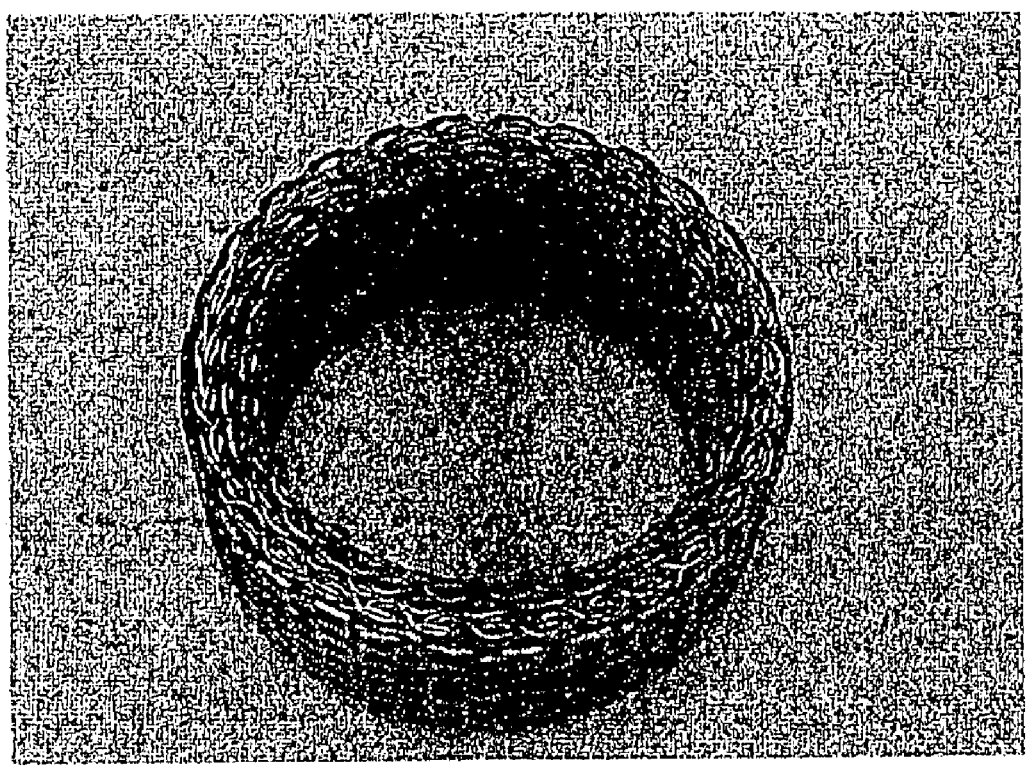
FIG. 7 is a photograph showing a state of combustion residues after combustion in Comparative Example 2.

An inflator was obtained using the inflator in Example 2 and the molded article of the gas generating composition in Comparative Example 1. This inflator was examined in the same tank test as in Example 1, then the inflator was dismantled and the inside was observed. As shown in FIG. 7 (photograph of the inflator from which the coolant/filter was removed), combustion residues hardly remained in the combustion chamber (chamber accommodating the molded article of the gas generating composition), and a majority thereof adhered to the coolant/filter.

Examples 3 to 5

Inflators were obtained in the same manner as in Example 1 except that molded articles of gas generating agents consisting of the compositions shown in Table 1 were used. These inflators were examined in the same tank test as in Example 1, and when the inflators were dismantled and observed, the combustion residues, similar to those in Example 1, were confirmed to be maintained as a single-perforated (but porous) cylinder in the same form as before combustion.

TABLE 1

|  | Example 3 | Example 4 | Example 5 |
|---|---|---|---|
| composition of molded article of gas generating composition (weight %) | Melamine/BCN/CMCNa/aluminum hydroxide = 17.76/74.24/3/5 | Melamine/BCN/CMCNa/aluminum hydroxide = 18.76/73.24/3/5 | Melamine/BCN/CMCNa/aluminum hydroxide = 14.91/70.09/5/10 |
| combustion flame temperature (° C.) | 1085 | 1070 | 1022 |
| metal content (weight %) | 41.3 | 40.8 | 41.0 |
| ratio of high-melting metal (weight %) | 7.7 (alumina) | 99.2 (alumina 7.8 + copper 91.4) | 98.6 (alumina 14.7 + copper 83.9) |
| first ratio of combustion residues (%) | 42 | 42 | 42 |
| second ratio of combustion residues (%) | 95 or more | 95 or more | 95 or more |
| $W_2$ | 17.6 | 17.5 | 17.6 |
| $W_3$ | 18.0 | 17.8 | 18.5 |

BCN: Basic copper nitrate,
CMCNa: carboxymethyl cellulose sodium salt

What is claimed is:

1. An inflator for an air bag, comprising:

a housing having a gas discharging port;

a combustion chamber provided in said housing and accommodating a molded article of a gas generating composition which is burnt to generate a gas; and ignition means provided in said housing for igniting the molded article of a gas generating composition;

wherein the molded article of the gas generating composition comprises a gas generating agent containing (a) a fuel selected from the group consisting of triazine derivatives, triazole derivatives, tetrazole derivatives, guanidine derivatives, azodicarbonamide derivatives, and hydrazine derivatives and (b) a metal-containing oxidizing agent selected from the group consisting of oxy acid salts, metal oxides, metal complex oxides, metal peroxides, and basic metal nitrates and meets the following requirements (A) and (B):

(A) the (theoretical) combustion flame temperature of the molded article of the gas generating composition is 2000° C. or less, and part or the whole of the metal or metal oxide after combustion of the molded article of the gas generating composition has a melting point not lower than the combustion flame temperature; and (B) bulk combustion residues remain in the combustion chamber at the time of combustion of the molded article of the gas generating composition.

2. An inflator for an air bag, comprising:

a housing having a gas discharging port;

a combustion chamber provided in said housing and accommodating a molded article of a gas generating composition which is burnt to generate a gas;

ignition means provided in said housing for igniting the molded article of a gas generating composition; and a porous dividing member arranged between the gas discharging port and the molded article of the gas generating composition, wherein the combustion gas is discharged via the dividing member from the gas discharging port, and wherein the molded article of the gas generating composition comprises a gas generating agent containing (a) a fuel selected from the group consisting of triazine derivatives, triazole derivatives, tetrazole derivatives, guanidine derivatives, azodicarbonamide derivatives, and hydrazine derivatives and (b) a metal-containing oxidizing agent selected from the group consisting of oxy acid salts, metal oxides, metal complex oxides, metal peroxides, and basic metal nitrates and meets the following requirements (A) and (B):

(A) the (theoretical) combustion flame temperature of the molded article of the gas generating composition is 2000° C. or less, and part or the whole of the metal or metal oxide after combustion of the molded article of the gas generating composition has a melting point not lower than the combustion flame temperature; and (B) bulk combustion residues remain in the combustion chamber at the time of combustion of the molded article of the gas generating composition.

3. The inflator for an air bag according to claim 1 or 2, wherein the combustion flame temperature in the requirement (A) is 1800° C. or less.

4. The inflator for an air bag according to claim 1 or 2, wherein the combustion flame temperature in the requirement (A) is 1600° C. or less.

5. The inflator for an air bag according to claim 1 or 2, wherein the combustion flame temperature in the requirement (A) is 1400° C. or less.

6. The inflator for an air bag according to claim 1 or 2, wherein the combustion flame temperature in the requirement (A) is 1200° C. or less.

7. The inflator for an air bag according to claim 1 or 2, wherein the lower limit of the combustion flame temperature in the requirement (A) is 800° C.

8. The inflator for an air bag according to claim 1 or 2, wherein the lower limit of the combustion flame temperature in the requirement (A) is 900° C.

9. The inflator for an air bag according to claim 1 or 2, wherein, in the requirement (A), in the metal or metal oxide after combustion of the molded article of the gas generating composition, those having a higher melting point than the combustion flame temperature of the molded article of the gas generating composition is not less than 2% by weight.

10. The inflator for an air bag according to claim 1 or 2, wherein, in the requirement (A), in the metal or metal oxide after combustion of the molded article of the gas generating composition, those having a higher melting point than the combustion flame temperature of the molded article of the gas generating composition is not less than 5% by weight.

11. The inflator for an air bag according to claim 1 or 2, wherein, in the requirement (A), in the metal or metal oxide after combustion of the molded article of the gas generating composition, those having a higher melting point than the combustion flame temperature of the molded article of the gas generating composition is not less than 50% by weight.

12. The inflator for an air bag according to claim 1 or 2, wherein, in the requirement (A), in the metal or metal oxide after combustion of the molded article of the gas generating composition, those having a higher melting point than the combustion flame temperature of the molded article of the gas generating composition is not less than 90% by weight.

13. The inflator for an air bag according to claim 1 or 2, wherein, in the requirement (A), the metal or metal oxide after combustion of the molded article of the gas generating composition is copper, silica, alumina, cobalt oxide, iron oxides ($Fe_2O_3$, FeO and $Fe_3O_4$), strontium oxide, barium oxide, calcium oxide, magnesium oxide, titanium oxide, tungsten oxide, or a combination of an alkaline earth metal oxide and silica.

14. The inflator for an air bag according to claim 1 or 2, wherein, in the requirement (B), the shape of the molded article of the gas generating composition is approximate to the shape of bulk combustion residues.

15. The inflator for an air bag according to claim 1 or 2, wherein, in the requirement (B), the ratio (weight ratio) of the bulk combustion residues to the molded article of the gas generating composition before combustion is 10% or more.

16. The inflator for an air bag according to claim 1 or 2, wherein, in the requirement (B), the ratio (weight ratio) of the bulk combustion residues to the molded article of the gas generating composition before combustion is 20% or more.

17. The inflator for an air bag according to claim 1 or 2, wherein, in the requirement (B), the ratio (weight ratio) of the bulk combustion residues to the molded article of the gas generating composition before combustion is 30% or more.

18. The inflator for an air bag according to claim 1 or 2, wherein, in the requirement (B), the upper limit of the ratio (weight ratio) of the bulk combustion residues to the molded article of the gas generating composition before combustion is 60%.

19. The inflator for an air bag according to claim 1 or 2, wherein, in the requirement (B), the ratio (weight ratio) of the bulk combustion residues to the theoretical amount of residues is 50% or more.

20. The inflator for an air bag according to claim 1 or 2, wherein, in the requirement (B), the ratio (weight ratio) of the bulk combustion residues to the theoretical amount of residues is 80% or more.

21. The inflator for an air bag according to claim 1 or 2, wherein, in the requirement (B), the ratio (weight ratio) of the bulk combustion residues to the theoretical amount of residues is 90% or more.

22. The inflator for an air bag according to claim 1 or 2, wherein, in the requirement (B), the ratio (weight ratio) of the bulk combustion residues to the theoretical amount of residues is 95% or more.

23. The inflator for an air bag according to claim 1 or 2, wherein the metal content in the molded article of the gas generating composition is 20 to 50% by weight.

24. The inflator for an air bag according to claim 1 or 2, wherein the metal content in the molded article of the gas generating composition is 20 to 45% by weight.

25. The inflator for an air bag according to claim 2, wherein the porous dividing member comprises a single-layer body or a laminated body consisting of two or more layers having different functions.

26. The inflator for an air bag according to claim 2, wherein, when the porous dividing member comprises a single-layer body, the porous dividing member is a supporting member having a first leakage preventing function of preventing leakage of the molded article of the gas generating composition from the gas discharging port at least before and during combustion.

27. The inflator for an air bag according to claim 26, wherein the supporting member has a second leakage preventing function of preventing leakage of the combustion residues from the gas discharging port during and after combustion.

28. The inflator for an air bag according to claim 2, wherein the porous dividing member comprises a laminated body of two or more layers, the porous dividing member has one, two or three members selected from the group consisting of a retaining member for fixing the supporting member, a protecting member for preventing deformation of the supporting member and a coolant for cooling a combustion gas, in addition to the supporting member having the first leakage preventing function, or having the first and second leakage preventing functions.

29. The inflator for an air bag according to claim 2, wherein the porous dividing member does not substantially cool a combustion gas.

30. The inflator for an air bag according to claim 2, wherein the pressure loss, of the combustion gas, to the porous dividing member, is 10 kPa or less in the atmosphere at 20° C. to 1000 L/min of air stream.

31. The inflator for an air bag according to claim 2, wherein the pressure loss, of the combustion gas, to the porous dividing member, is 5 kPa or less in the atmosphere at 20° C. to 1000 L/min of air stream.

32. The inflator for an air bag according to claim 2, wherein the pressure loss, of the combustion gas, to the porous dividing member, is 1 kPa or less in the atmosphere at 20° C. to 1000 L/min of air stream.

33. The inflator for an air bag according to claim 2, wherein the pressure loss, of the combustion gas, to the porous dividing member, is 0.1 kPa or less, or there is substantially no pressure loss in the atmosphere at 20° C. to 1000 L/min of air stream.

34. The inflator for an air bag according to claim 2, which has a gap between the porous dividing member and the gas discharging port.

35. The inflator for an air bag according to claim 1 or 2, wherein the triazine derivative is a member selected from the group consisting of triazine, melamine, trihydrazinotriazine, trimethylol melamine, alkylated methylol melamine, ammeline, ammelide, ammuneland, cyanuric acid, a cyanuric acid derivative, melam, melem, melamine nitrate, melamine perchlorate and nitrated melamine.

36. The inflator for an air bag according to claim 1 or 2, wherein the triazole derivative, tetrazole derivative, guanidine derivative, azodicarbonamide derivative and hydrazine derivative are 5-oxo-1,2,4-triazole, tetrazole, 5-aminotetrazole, 5,5'-bi-1H-tetrazole, guanidine, nitroguanidine, cyanoguanidine, triaminoguanidine nitrate, guanidine nitrate, guanidine carbonate, burette, azodicarbonamide, carbohydrazide, carbohydrazide nitrate complexes, dihydrazide oxalate and hydrazine nitrate complexes.

37. The inflator for an air bag according to claim 1 or 2, wherein the basic metal nitrate is at least one member selected from the group consisting of basic copper nitrate, basic cobalt nitrate, basic zinc nitrate, basic manganese nitrate, basic iron nitrate, basic molybdenum nitrate, basic bismuth nitrate and basic cerium nitrate.

38. The inflator for an air bag according to claim 1 or 2, wherein the content of the (a) component in the molded article of the gas generating composition is 5 to 60% by weight, and the content 6f the (b) component therein is 40 to 95% by weight.

39. The inflator for an air bag according to claim 1 or 2, wherein the molded article of the gas generating composition further comprises at least either of (c) a binder and (d) an additive.

40. The inflator for an air bag according to claim 39, wherein the binder as the (c) component contained in the molded article of the gas generating composition is at least one member selected from the group consisting of carboxymethyl cellulose, carboxymethyl cellulose sodium salt, carboxymethyl cellulose potassium salt, carboxymethyl cellulose ammonium salt, cellulose acetate, cellulose acetate butyrate, methyl cellulose, ethyl cellulose, hydroxyethyl cellulose, ethyl hydroxyethyl cellulose, hydroxypropyl cellulose, carboxymethyl ethyl cellulose, fine crystalline cellulose, polyacrylamide, aminated polyacrylamide, polyacryl hydrazide, acrylamide-metal acrylate copolymers, polyacrylamide-polyacrylate copolymers, polyvinyl alcohol, acrylic rubber, guar gum, starch and silicone.

41. The inflator for an air bag according to claim 39, wherein the additive as the (d) component contained in the molded article of the gas generating composition is at least one selected from the group consisting of a metal oxide selected from copper oxide, iron oxide, zinc oxide, cobalt oxide, manganese oxide, molybdenum oxide, nickel oxide, bismuth oxide, silica and aluminum, a metal hydroxide selected from the group consisting of aluminum hydroxide, cobalt hydroxide and iron hydroxide, a metal carbonate or a basic metal carbonate selected from cobalt carbonate, calcium carbonate, basic zinc carbonate and basic copper carbonate, a complex compound of metal oxide or metal hydroxide selected from the group consisting of Japanese acid: clay, kaolin, talc, bentonite, diatomaceous earth and hydrotalcite, a metal acid salt selected from the group consisting of sodium silicate, mica, molybdate, cobalt molybdate and ammonium molybdate, silicone, molybdenum disulfide, calcium stearate, silicon nitride, silicon carbide and a catalyst having ruthenium carried on alumina or silica.

42. The inflator for an air bag according to claim 38, wherein the content of the (c) component in the molded article of the gas generating composition is 0.1 to 15% by weight, and the content of the (d) component therein is 0.1 to 20% by weight.

43. The inflator for an air bag according to claim 1 or 2, wherein the (a) component in the molded article of the gas generating composition is melamine, and the (b) component therein is basic copper nitrate.

44. The inflator for an air bag according to claim 38, wherein the molded article of the gas generating composition comprises (a) 10 to 25% by weight of melamine, (b) 60 to 80% by weight of basic copper nitrate, (c) 0.1 to 10% by weight of carboxy methyl cellulose sodium salt, and (d) 1 to 15% by weight of aluminum hydroxide or (d) 1 to 10% by weight of cobalt oxide.

45. The inflator for an air bag according to claim 38, wherein the molded article of the gas generating composition comprises (a) 10 to 25% by weight of trihydrazinotriazine, (b) 60 to 80% by weight of basic copper nitrate, (c) 0.1 to 10% by weight of carboxy methyl cellulose sodium salt, and (d) 1 to 15% by weight of aluminum hydroxide or (d) 1 to 10% by weight of cobalt oxide.

46. The inflator for an air bag according to claim 1 or 2, wherein the molded article of the gas generating composition is in the form of a cylinder, a single-perforated cylinder, a perforated cylinder, a doughnut or a pellet.

47. An airbag apparatus including an inflator for an air bag, an impact sensor which, upon sensing impact, actuates the inflator, an airbag expanding by introducing a gas generated in the inflator into the airbag, and a module case accommodating the airbag, wherein the inflator for an air bag is an inflator for an air bag described in claims 1 or 2.

48. The inflator for an air bag according to claim 1 or 2, wherein the molded article of the gas generating composition is a single-perforated cylinder that comprises melamine, basic copper nitrate, sodium carboxymethylcellulose, and aluminum hydroxide and wherein the inflator has a single layer porous dividing member arranged between the gas discharging port and the gas generant article, wherein said dividing member comprises a punched metal support and a wire mesh retainer having one round of winding of the wire mesh.

49. The inflator for an air bag according to claim 1 or 2, wherein fuel (a) is a triazine derivative.

50. The inflator for an air bag according to claim 1 or 2, wherein metal-containing oxidizing agent (b) is at least one compound selected from: oxy acid salts having ammonium, alkali metal, or alkaline earth metal cations and nitrate, nitrite, chlorate, or perchloate anions; metal oxides, metal peroxides, and metal complex oxides of copper, cobalt, iron, manganese nickel, zinc, molybdenum, or bismuth; and basic metal nitrates selected from the group consisting of basic copper nitrates, basic cobalt nitrate, basic zinc nitrate, basic maganese nitrite, basic iron nitrate, basic bismuth nitrate, and basic cerium nitrate.

51. The inflator for an air bag according to claim 1 or 2, wherein metal-containing oxidizing agent (b) is a basic metal nitrate of the formula $$M(NO_3)y \cdot nM(OH)z \text{ or } Mx'(NO_3)y'(OH)z'$$

wherein M represents a metal, x' represents the number of metals, y and y' each represents the number of $NO_3$ ions, z' represents the number of OH ions, and n represents the ratio of the $M(OH)z$ moiety to the $M(NO_3)y$ moiety.

* * * * *